March 18, 1924.
L. H. RATHKE
WEED CUTTER
Filed Sept. 7, 1920
1,487,472
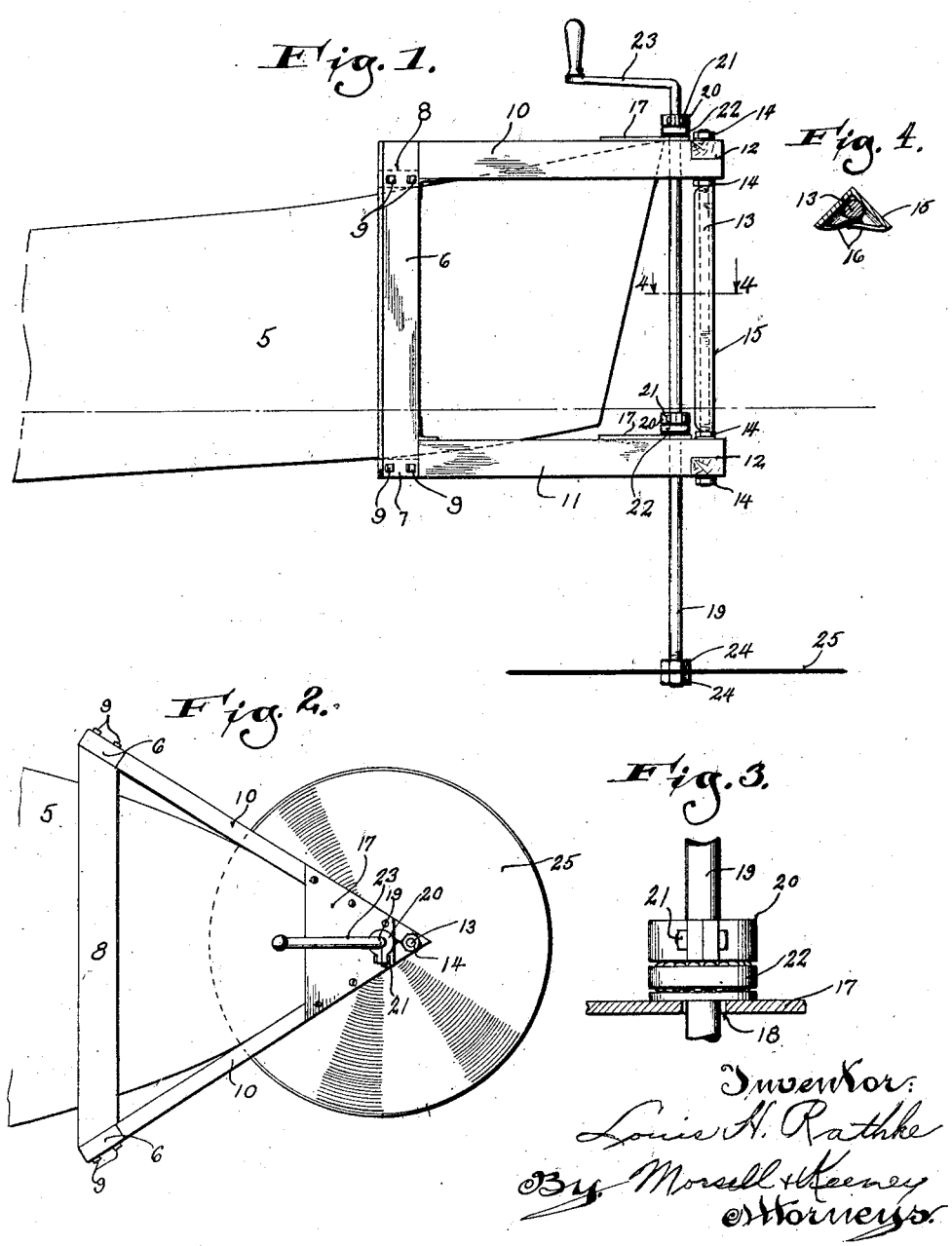

Patented Mar. 18, 1924.

1,487,472

UNITED STATES PATENT OFFICE.

LOUIS H. RATHKE, OF MILWAUKEE, WISCONSIN.

WEED CUTTER.

Application filed September 7, 1920. Serial No. 408,524.

*To all whom it may concern:*

Be it known that I, LOUIS H. RATHKE, a citizen of the United States, and resident of Milwaukee, in the county of Milwaukee and State of Wisconsin, have invented new and useful Improvements in Weed Cutters, of which the following is a description, reference being had to the accompanying drawings, which are a part of this specification.

The present invention relates to certain new and useful improvements in weed cutters, more especially adapted for use in cutting weeds under water.

Many of the picturesque small lakes are becoming so overrun by weeds that in time they will be entirely useless as summer resorts, and, in fact, will be eventually completely obliviated. This is due to the fact that heretofore no one has devised a weed cutter within the means of the average vacationist who owns a place fronting such lakes and furthermore, because the weed cutters that have been devised are all of unwieldy construction and have been more or less in their own way during the cutting process.

Hence this invention has for one of its objects to provide an extremely simple form of weed cutter for severing the weeds at any distance beneath the water's surface and which will be capable of ready securement to and detachment from the ordinary rowboat, canoe, scow, or other form of support.

Another object of this invention is to provide an improved form of cutter formed from a single disc whereby the same will not be dulled or clogged by the foreign matter encountered and whereby the same may be readily sharpened by holding a stone or file thereagainst.

This invention has for a further object to provide an attaching frame which is readily detachably engageable with a boat or the like and which may be adapted for boats of various shapes and sizes.

A still further object of this invention is to provide a weed cutter having a vertically adjustable driven shaft therefor provided with ball bearings and having a deflector or weed guard positioned in front thereof to prevent the cut weeds from entangling therearound.

With the above and other objects in view which will appear as the description proceeds, my invention resides in the novel construction, combination and arrangement of parts substantially as hereinafter described and more particularly defined by the appended claims, it being understood that such changes in the precise embodiment of the hereindisclosed invention may be made as come within the scope of the claims.

In the accompanying drawing, I have illustrated one complete example of the physical embodiment of my invention constructed according to the best mode I have so far devised for the practical application of the principles thereof, and in which:

Figure 1 is a side view of one end of a boat illustrating my invention as attached thereto;

Figure 2 is a top plan view thereof;

Figure 3 is an enlarged fragmentary view part in section and part in elevation of a portion of the driven shaft and the bearing therefor; and Figure 4 is a fragmentary transverse sectional view illustrating the shaft guard or weed deflector, said view being taken on the line 4—4 of Figure 1.

Referring now more particularly to the accompanying drawing, in which like numerals designate like parts throughout the several views:

The numeral 5 represents a boat of any desired shape or construction over one end of which my improved frame is readily detachably engageable. My improved frame consists of a rear rectangular portion formed by two vertical side beams 6, a bottom transverse beam 7 and a top transverse beam 8, the beams 7 and 8 being connected with the beams 6 by lag screws 9 or the like. Connected to the rectangular frame thus formed are two pairs of forwardly extending converging beams 10 and 11 which have their extreme forward ends connected together by the joints 12.

The pairs of beams 10 and 11 have their forward ends or points connected in spaced relation by a vertical base rod 13 which serves to secure the joints 12 in position. The rod 13 is secured in place by the nuts 14 and is enclosed by a deflector or weed guard 15 formed from angle irons and having the extreme ends thereof bent inwardly, as at 16, whereby the same is retained about said shaft. Secured to each pair of beams 10 and 11 near the forward end thereof is a substantially triangularly shaped plate 17. The plates 17 have vertically alined apertures 18 therein through which extend a cutter or driven shaft 19, said shaft being adjustably positioned within the apertures 18 by collar members 20 adjustably secured to said shaft adjacent the plates by bolts 21. Positioned between the plates 17 and collars 20 are ball bearings 22 for reducing the friction, as will be readily obvious.

The upper end of shaft 19 is provided with a crank or handle 23 and removably secured to the lower end of said shaft by nuts 24 is a cutting disc 25. The disc 25 has its edges plain but beveled to provide a cutting edge thereon and a rotation of the disc will readily sever any weeds the same comes into contact with.

In use, the frame is engaged over the bow of the boat 5 which is moved back and forth through the weeds, and at the same time the shaft 19 is rotated by the crank 23 which will cause the disc 25 to readily sever the weeds. The depth at which the weeds are cut beneath the water may be readily controlled by the collars 20, as will be readily apparent. To prevent the weeds from entangling about the upper portion of the shaft 19 and becoming entangled in the lowermost bearing 22, I provide the improved form of weed guard 15, which deflects the same to either side thereof, as will be readily apparent.

What I claim as my invention is:

1. A machine for cutting weeds and the like under water comprising a substantially V-shaped frame adapted to be readily detachably secured externally of the bow of a boat; a shaft rotatably and slidably journalled in said frame; means for controlling the vertical position of said shaft relative to said frame; and a cutting disc carried by said shaft.

2. A machine for cutting weeds and the like under water comprising a substantially V-shaped frame adapted to be readily detachably secured externally of the bow of a boat; a shaft rotatably and slidably journalled in said frame adjacent its apex; means carried by said shaft for controlling its vertical position relative to said frame; a guard carried by the apex of said frame in advance of said shaft; and a cutting disc carried by the lower end of said shaft.

3. In a device for cutting weeds and the like under water comprising a substantially V-shaped frame adapted to be readily detachably secured externally of the bow of a boat; a vertical shaft rotatably and slidably journalled in said frame adjacent its apex; collars carried by said shaft for controlling the vertical position thereof relative to said frame; a substantially rigid V-shaped weed guard carried by the apex of said frame in advance of said shaft; and a cutting disc carried by the lower end of said shaft.

In testimony whereof, I affix my signature.

LOUIS H. RATHKE.